(12) United States Patent
Wang et al.

(10) Patent No.: US 9,519,311 B2
(45) Date of Patent: Dec. 13, 2016

(54) ELECTRONIC DEVICE

(71) Applicant: Acer Incorporated, New Taipei (TW)

(72) Inventors: Jian-Siang Wang, New Taipei (TW); Hung-Chi Chen, New Taipei (TW); Feng-Ming Liu, New Taipei (TW); Jia-Ren Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/801,846

(22) Filed: Jul. 17, 2015

(65) Prior Publication Data

US 2016/0327983 A1    Nov. 10, 2016

(30) Foreign Application Priority Data

May 8, 2015 (TW) .............................. 104114723 A

(51) Int. Cl.
*G06F 1/16* (2006.01)
*G06F 1/18* (2006.01)

(52) U.S. Cl.
CPC ............. *G06F 1/1632* (2013.01); *G06F 1/182* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,590,024 A * | 12/1996 | Honda | ................... | G06F 1/1616 361/679.32 |
| 6,519,139 B2 * | 2/2003 | Kambayashi | ......... | G06F 1/1616 248/118.3 |
| 6,687,120 B2 * | 2/2004 | Hood | ................ | A61F 13/15593 343/720 |
| 6,842,332 B1 * | 1/2005 | Rubenson | ............. | G06F 1/1616 361/679.09 |
| 7,061,751 B2 * | 6/2006 | Hamada | ................ | G06F 1/1688 361/679.23 |
| 7,515,405 B2 * | 4/2009 | Lev | ......................... | G06F 1/162 361/679.07 |
| 8,300,389 B2 * | 10/2012 | Kang | ................... | H04M 1/0254 361/679.01 |
| 8,467,178 B2 * | 6/2013 | Probst | .................... | G06F 1/1616 345/168 |
| 8,897,002 B2 * | 11/2014 | Degner | ................. | G06F 1/1658 343/841 |

(Continued)

*Primary Examiner* — Lisa Lea Edmonds
(74) *Attorney, Agent, or Firm* — Jianq Chyun IP Office

(57) ABSTRACT

An electronic device including a casing, a sound cabinet structure and a magnetic element is provided. The casing has an accommodating recess located inside the casing. The sound cabinet structure is located inside the casing and adjacent to the accommodating recess. The sound cabinet structure includes a resonance cavity and a sound output opening. The resonance cavity is communicated with the accommodating recess. The sound output opening penetrates through the casing and is communicated with the resonance cavity. The magnetic element is disposed inside the accommodating recess and adaptable to move in the accommodating recess, so that the casing is adaptable to be connected with an object or remove from the object. A hitting sound generated by the magnetic element while moving in and contacting the accommodating recess passes through and is effected by the sound cabinet structure.

10 Claims, 3 Drawing Sheets

(56) References Cited

U.S. PATENT DOCUMENTS

| | | | | |
|---|---|---|---|---|
| 8,988,867 B2* | 3/2015 | Kuroda | ............... | H05K 5/0017 |
| | | | | 349/58 |
| 9,007,761 B2* | 4/2015 | Wolff | .................... | G06F 1/1632 |
| | | | | 361/679.43 |
| 9,380,364 B2* | 6/2016 | Chen | ..................... | H04R 1/025 |

* cited by examiner

ELECTRONIC DEVICE

CROSS-REFERENCE TO RELATED APPLICATION

This application claims the priority benefit of Taiwan application serial no. 104114723, filed on May 8, 2015. The entirety of the above-mentioned patent application is hereby incorporated by reference herein and made a part of this specification.

BACKGROUND OF THE INVENTION

Field of the Invention

The invention is related to an electronic device, and more particularly to an electronic device equipped with a magnetic element.

Description of Related Art

Over the past few years, the technology industry has developed significantly and rapidly. Electronic devices such as electronic products, including notebook (NB) computer, tablet PC and smart phones are commonly used in people's daily lives. The form and function of the electronic device are diverse as well. These electronic devices are popularized since they are convenient to use and useful; moreover, they may be used differently depending on the user's need. For example, the electronic devices may be equipped with a magnetic element as a connecting assembly or a sensor assembly to perform more functions.

Specifically, take tablet PC as an example, a magnetic element may be disposed inside a casing of the tablet PC, such that the tablet PC may be assembled on another object (e.g. a keyboard docking station) via magnetic force. Alternatively, take NB computer as another example, a magnetic element may be disposed inside the upper body of the NB computer, such that the upper body may touch a sensor element in the lower body via the magnetic element to activate the sleep state when the upper body covers the lower body. However, when the casing of the electronic device is attached to another object via the magnetic element disposed therein to be connected to the object, the magnetic element may cause a sharp hitting sound owing to the touch with the casing, causing grating sound to the user.

SUMMARY OF THE INVENTION

The invention provides an electronic device which may generate a specific hitting sound when being connected to another object.

In the invention, an electronic device includes a casing, a sound cabinet structure and a magnetic element. The casing has an accommodating recess located inside the casing. The sound cabinet structure is located inside the casing and adjacent to the accommodating recess. The sound cabinet structure includes a resonance cavity and a sound output opening. The resonance cavity is communicated with the accommodating recess. The sound output opening penetrates through the casing and is communicated with the resonance cavity. The magnetic element is disposed inside the accommodating recess and adaptable to move in the accommodating recess, so that the casing is adaptable to be connected with an object or removed from the object. A hitting sound generated by the magnetic element while moving in and contacting the accommodating recess passes through and is effected by the sound cabinet structure.

Based on the above, in the electronic device of the invention, the magnetic element is disposed in the accommodating recess of the casing, so that the casing is connected to the object or be removed from the object with the movement of the magnetic element in the accommodating recess. Also, the sound cabinet structure is disposed in the casing to effect the hitting sound generated by the magnetic element while moving in and contacting the accommodating recess. Specifically, the sound cabinet structure includes the resonance cavity communicated with the accommodating recess and the sound output opening communicated with the resonance cavity. Therefore, the hitting sound generated by the magnetic element may pass through and be effected by the sound cabinet structure, and the effect may be tone changing. Accordingly, the electronic device of the invention may generate a specific hitting sound when being connected to another object.

In order to make the aforementioned features and advantages of the invention more comprehensible, embodiments accompanying figures are described in detail below.

DESCRIPTION OF EMBODIMENTS

Figure 1:
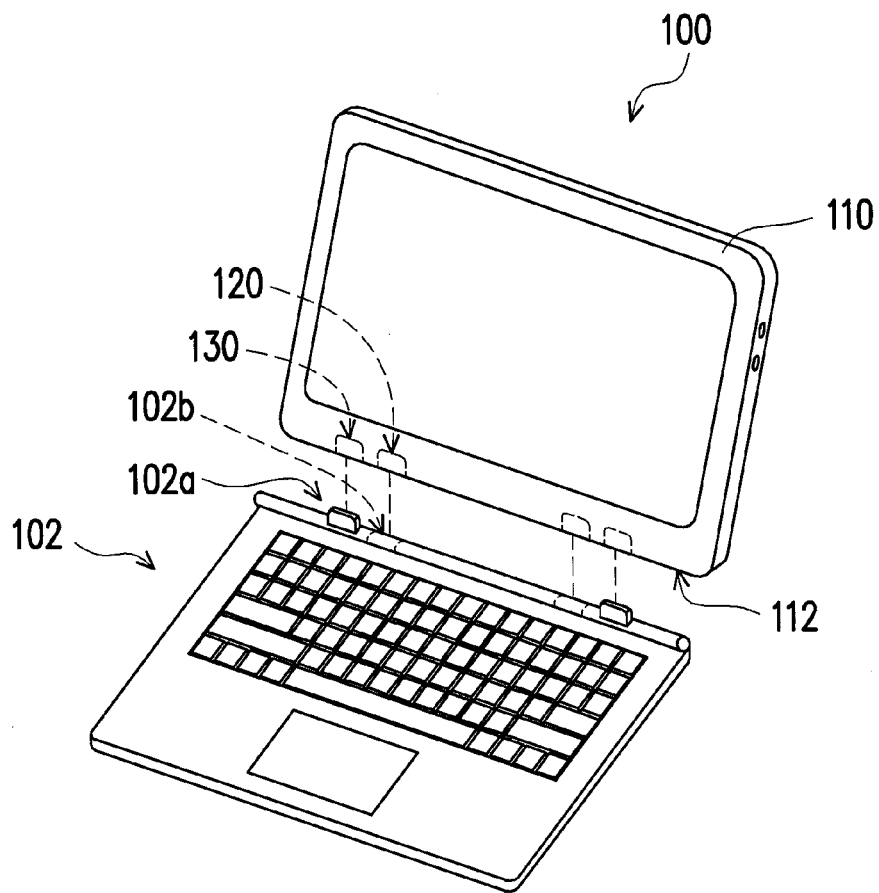
FIG. 1 is a schematic view illustrating an electronic device according to an embodiment of the invention.

FIG. 1 is a schematic view illustrating an electronic device according to an embodiment of the invention. Referring to FIG. 1, in the embodiment, an electronic device 100 includes a casing 110 and a magnetic element 120. The electronic device 100 includes a processor, a circuit board, a battery, a display panel, a touch panel, an input/output port or other suitable electronic assemblies that are not shown. The above electronic assemblies are disposed inside the casing 110. The magnetic element 120 is disposed inside the casing 110 and located in the casing 110, for example, in a lateral side 112 of the casing 110. With such configuration, the casing 110 of the electronic device 100 may be connected to another object 102 via the magnetic element 120.

Specifically, in the embodiment, the electronic device 100 is, for example, a tablet PC, and the object 102 is, for example, a docking station having a keyboard module and a touch pad. Furthermore, the electronic device 100 of the embodiment is equipped with a connecting portion 130 disposed in the lateral side 112 of the casing 110 and adjacent to the magnetic element 120. Correspondingly, the object 102 is equipped with another connecting portion 102*a* corresponding to the connecting portion 130 and another magnetic element 102*b* corresponding to the magnetic element 120. The connecting portions 130 and 102*a* are, for example, a combination of a slot and a lock, which should not be construed as a limitation to the invention. With such configuration, the casing 110 is adaptable to be connected to the object 102 via the connecting portion 130 being connected with the connecting portion 102*a* of the object 102 and via the magnetic element 120 being attached to the magnetic element 102*b* of the object 102. In other words, the casing 110 of the electronic device 100 may further be connected to the object 102 via mechanical force and magnetic force. However, the invention provides no limitation to whether the connecting portion 130 is configured or not, which may be adjusted depending on needs.

In addition, in another embodiment that is not shown, the electronic device may also be a notebook (NB) computer. The casing and an electronic assembly disposed therein are constructed as an upper body, and the object may be a lower body of the electronic device. The upper body formed by the casing and the electronic assembly and the lower body serving as the object may be connected together via a hinge module, such that the upper body may rotate relative to the lower body and be connected to the lower body via the magnetic element disposed in the casing to further cover the lower body, so that the NB computer used as the electronic device is in a close state. Besides, the magnetic element used in the electronic device is not limited to being used as a connecting member, which may also be used to touch the sensor element disposed in the lower body to activate the sleep state. The invention provides no limitation to the type of the electronic device and the manner of how the magnetic element is used.

Figure 2:
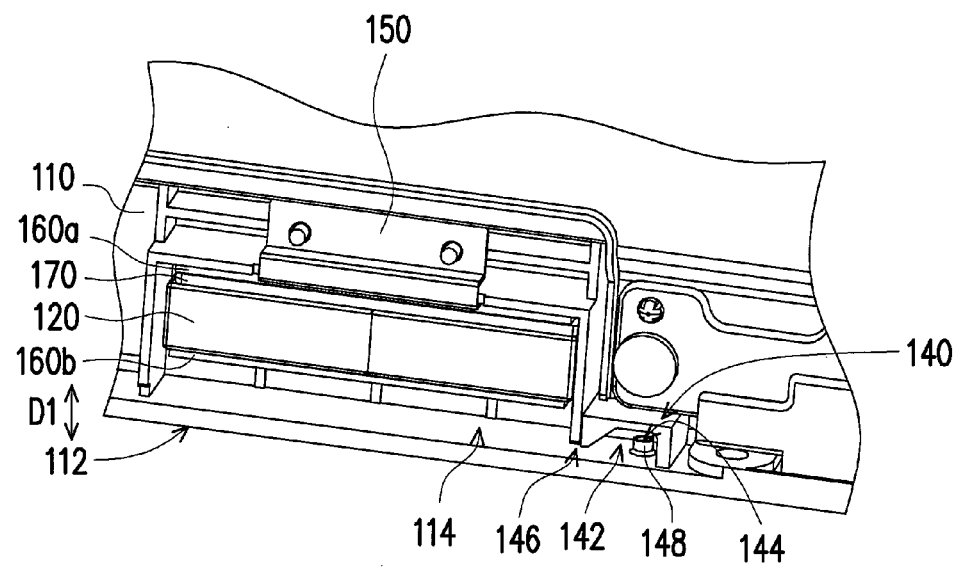
FIG. 2 is a partial schematic view illustrating the electronic device of FIG. 1.
Figure 3:
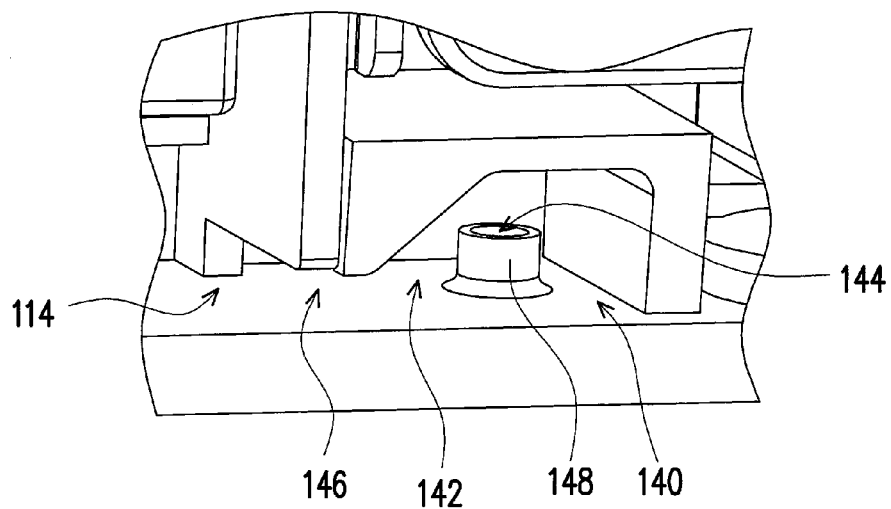
FIG. 3 is a partial schematic view illustrating a sound cabinet structure of FIG. 2.
Figure 4:
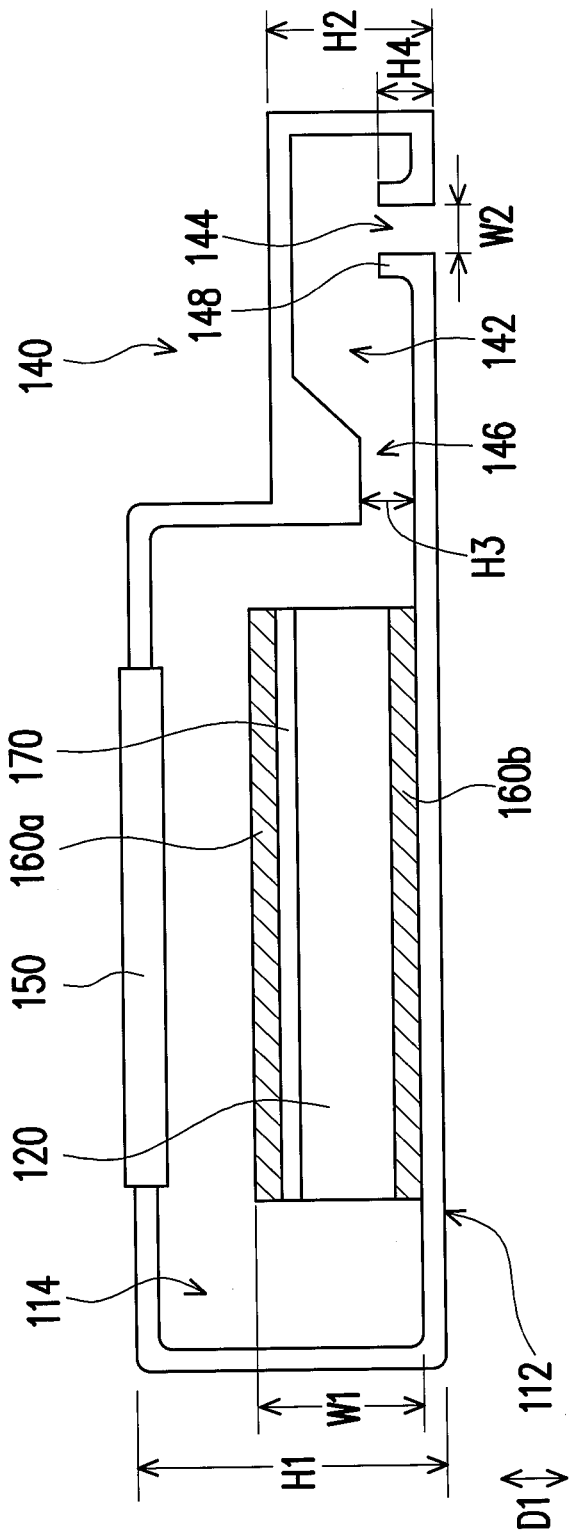
FIG. 4 is a sectional schematic view illustrating the electronic device of FIG. 2.

FIG. 2 is a partial schematic view illustrating the electronic device of FIG. 1. FIG. 3 is a partial schematic view illustrating a sound cabinet structure of FIG. 2. FIG. 4 is a sectional schematic view illustrating the electronic device of FIG. 2. Referring to FIGS. 1-4, in the embodiment, the casing 110 of the electronic device 100 is adaptable to be connected to the object 102 or removed from the object 102 with the movement of the magnetic element 120. The magnetic element 120 generates a hitting sound while moving and contacting the inner structure of the casing 110. The hitting sound is relatively grating. Therefore, in the embodiment, a sound cabinet structure 140 is disposed in the casing 110 of the electronic device 100 to effect the hitting sound, such that the electronic device 100 generates a specific hitting sound.

Specifically, in the embodiment, the electronic device 100 includes the casing 110, the magnetic element 120 and the sound cabinet structure 140. The casing 110 has an accommodating recess 114 located in the casing 110. The sound cabinet structure 140 is located in the casing 110 and adjacent to the accommodating recess 114. The sound cabinet structure 140 includes a resonance cavity 142 and a sound output opening 144. The resonance cavity 142 is communicated with the accommodating recess 114, the sound output opening 144 penetrates through the casing 110 and communicates with the resonance cavity 142. The magnetic element 120 is disposed in the accommodating recess 114 and adaptable to move in the accommodating recess 114, such that the casing 110 is adaptable to be connected to the object 102 by the lateral side 112 or removed from the object 102 (as shown by FIG. 1). In the embodiment, the accommodating recess 114 and the sound cabinet structure 140 are adjacent to the lateral side 112 of the casing 110, such that the casing 110 is adaptable to be connected to the object 102 by the lateral side 112, which should not be construed as a limitation to the invention. The hitting sound generated by the magnetic element 120 while moving in and contacting the accommodating recess 114 passes through and is effected by the sound cabinet structure 140, for example, is transmitted out of the sound output opening 144 from the accommodating recess 114 through the resonance cavity 142, and the effect is, for example, tone changing.

In addition, in the embodiment, the electronic device 100 further includes a magnetized element 150. The magnetized element 150 is disposed in one side of the accommodating recess 114 away from the lateral side 112. The magnetic element 120 is, for example, a magnet, and the magnetized element 150 is, for example, a metal sheet, which should not be construed as a limitation to the invention. Furthermore, the electronic device 100 further includes two buffering elements 160a, 160b and a metal piece 170. The buffering elements 160a and 160b are disposed in opposite sides of the magnetic element 120, and the metal piece 170 is disposed between the magnetic element 120 and the magnetized element 150, so as to increase the magnetic force between the magnetic element 120 and the magnetized element 150. In other words, the buffering element 160a and the metal piece 170 are disposed between the magnetic element 120 and the magnetized element 150, and the buffering element 160b is disposed between the magnetic element 120 and the lateral side 112. However, the invention provides no limitation to whether the buffering elements 160a, 160b and the metal piece 170 are configured or not, which may be adjusted depending on needs.

In the embodiment, a height H1 of the accommodating recess 114 in a moving axis D1 is greater than a width W1 of the magnetic element 120 in the moving axis D1. In FIG. 4, the width W1 is actually a thickness of the magnetic element 120, buffering elements 160a, 160b and the metal piece 170 stacked together. However, the invention provides no limitation to whether the magnetized element 150, buffering elements 160a, 160b and the metal piece 170 are configured or not, which may be adjusted depending on needs. Therefore, in another embodiment where the buffering elements 160a, 160b and the metal piece 170 are not configured, the width W1 is the thickness of the magnetic element 120. Accordingly, the size design of the accommodating recess 114 allows the magnetic element 120 to move toward the magnetized element 150 or the lateral side 112 of the casing 110 relative to the accommodating recess 114 in the moving axis D1.

Therefore, in the embodiment, the magnetic element 120 is adaptable to be attached to the magnetized element 150 to contact one side of the accommodating recess 114 away from the lateral side 112, and adaptable to be attracted by the magnetic element 102b (as shown by FIG. 1) of the object 102 when the casing 110 moves near the object 102, such that the magnetic element 102 moves for a distance along the moving axis D1 to contact and hit another side of the accommodating recess 114 adjacent to the lateral side 112, and further enables the casing 110 to be attached to the object 102 and be connected to the object 102 by the lateral side 112. The buffering elements 160a and 160b are adaptable to correspondingly contact the magnetized element 150 (as shown by FIG. 2) or contact the side (as shown by FIG. 4) of the accommodating recess 114 adjacent to the lateral side 112 when the magnetic element 120 moves in the accommodating recess 114. However, the magnetic element 120 generates the hitting sound when moving and contacting the magnetized element 150 or the side of the accommodating recess 114 adjacent to the lateral side 112.

That is to say, in the embodiment, when the casing 110 is not close to the object 102, the magnetic element 120 is attached to the magnetized element 150. When the casing 110 is close to the object 102, the magnetic element 120 is attracted by the magnetic element 102b (as shown by FIG. 1) of the object 102, and the magnetic force between the magnetic element 120 and the magnetic element 102b is greater than the magnetic force between the magnetic element 120 and the magnetized element 150, such that the magnetic element 120 moves toward the lateral side 112 corresponding to the object 102, so that the casing 110 is connected to the object 102 by the lateral side 112. Such design may extend the distance between the magnetic element 120 relative to the lateral side 112 and the object 102 to avoid that the magnetic element 120 is attracted by the magnetic element 102b of the object 102 when the casing 110 is not in a predetermined distance close enough to the object 102, or avoid that the magnetic element 120 is attracted by other magnetic device near the casing 110 to interfere the operation of the electronic device 100.

On the other hand, in the embodiment, the resonance cavity 142 of the sound cabinet structure 140 is disposed in the side of the accommodating recess 114 and communicated to the accommodating recess 114; the sound output opening 144 penetrates through the casing 110 and is communicated with the resonance cavity 142. In other words, the accommodating recess 114, the resonance cavity 142 and the sound output opening 144 are communicated with each other and further communicated outside the casing 110. Accordingly, when the casing 110 is connected to the object 102 via the magnetic element 120, the magnetic element 120 moves toward the lateral side 112 corresponding to the object 102 from the magnetized element 150, and further hits the side of the accommodating recess 114 adjacent to the lateral side 112. At this time, the hitting sound generated by the magnetic element 120 moving in and contacting the side of the accommodating recess 114 adjacent to the lateral side 112 when the casing is connected to the object 102 may pass through and be effected by the sound cabinet structure 140, for example, be transmitted out of the sound output opening 144 from the accommodating recess 114 through the resonance cavity 142, and the effect is, for example, tone changing. The hitting sound passing through and being effected by the sound cabinet structure 140 is different from the conventional hitting sound generated by the magnetic element 120 when directly hitting the lateral side 112 of the casing 110. Therefore, the electronic device 100 may generate a specific hitting sound. Likewise, the hitting sound generated by the magnetic element 120 moving toward the magnetized element 150 again to be attached to the magnetized element 150 when the casing is removed from the object 102 may also pass through and be effected by the sound cabinet structure 140, for example, be transmitted out of the sound output opening 144 from the accommodating recess 114 through the resonance cavity 142, so that the tone thereof is changed to become the specific hitting sound.

Specifically, in the embodiment, the volume of the accommodating recess 114 is greater than the volume of the resonance cavity 142, and the volume of the resonance cavity 142 is greater than the volume of the sound output opening 144. To be more specific, a cross-section area of the accommodating recess 114 (as shown by FIG. 4, represented by height H1 of the accommodating recess 114 in the moving axis D1) is greater than a cross-section area of the resonance cavity 142 (as shown by FIG. 4, represented by height H2 of the resonance cavity 142 in the moving axis D1). The cross-section area of the resonance cavity 142 is greater than the cross-section area of the sound output opening 144 (as shown by FIG. 4, represented by width W2 of the sound output opening 144).

Furthermore, in the embodiment, the sound cabinet structure 140 further includes a channel 146. The accommodating recess 114 is communicated with the resonance cavity 142 via the channel 146, wherein a cross-section area of the channel 146 (as shown by FIG. 4, represented by height H3 of the channel 146 in the moving axis D1) is less than a cross-section area of the resonance cavity 142 (as shown by FIG. 4, represented by height H2 of the resonance cavity 142 in the moving axis D1). Moreover, a cross-section area of the channel 146 is less than a cross-section area of the accommodating recess 114 (as shown by FIG. 4, represented by height H1 of the accommodating recess 114 in the moving axis D1). Therefore, the channel 146 may be regarded as constructing a neck region between the accommodating recess 114 and the resonance cavity 142.

Accordingly, in the embodiment, the hitting sound may spread within the accommodating recess 114 having larger volume and then concentrate in the channel 146 constructed as the neck region. Thereafter, the hitting sound generates resonance in the resonance cavity 142 and is transmitted out of the sound output opening 144 having smaller cross-section area. The tone of the hitting sound changes throughout the transmission process in the path described above. Therefore, the hitting sound passing through and being effected by the sound cabinet structure 140 is different from conventional hitting sound generated by the magnetic element 120 hitting the lateral side 112 of the casing 110. Preferably, the electronic device 100 may transmit a specific hitting sound via the sound output opening 144, for example, with lower tone and deep sound effect. However, the invention provides no limitation to the tone of the hitting sound, which may be adjusted depending on needs.

With the design described above, in the embodiment, the sound cabinet structure 140 of the electronic device 100 has a design similar to a bass reflex cabinet. The sound output opening 144 may be regarded as a reflex port. The hitting sound may pass through and be effected by the sound cabinet structure 140, for example, be transmitted out of the sound output opening 144 after being resonated via the resonance cavity 142, to change the tone thereof.

Specifically, in the embodiment, the size design of the above components preferably meets the Helmholtz resonance theory for design of the bass reflex cabinet. That is to say, the frequency of the hitting sound generated by the magnetic element 120 and passing through the sound cabinet structure 140 is in a proportional relation to the volume of the resonance cavity 142, the cross-section area of the sound output opening 144 (as shown by FIG. 4, represented by width W2) and the length of the sound output opening 144 (as shown by FIG. 4, represented by height H4). The proportional relation is the Helmholtz formula:

$$f = \frac{c}{2\pi}\sqrt{\frac{S}{VL}}$$

In the above formula, f represents the frequency of the hitting sound generated by the magnetic element 120 and transmitted out of the sound output opening 144 (which means the frequency of the hitting sound sensed by the user), c represents speed of sound, V represents volume of the resonance cavity 142, S represents cross-section area of the sound output opening 144, and L represents the length of the sound output opening 144. Based on the above formula, the frequency of the hitting sound generated by the magnetic element 120 and passing through the sound cabinet structure 140 is in a direct ratio to the cross-section area of the sound output opening 144, and is in an inverse ratio to the volume of the resonance cavity 142 and the length of the sound output opening 144. Therefore, in order to change the tone of the hitting sound (for example, reduce the frequency of the hitting sound) generated by the magnetic element 120 and passing through the sound cabinet structure 140, the cross-section area of the sound output opening 144 may be decreased depending on needs. Meanwhile, the volume of the resonance cavity 142 or the length of the sound output opening 144 may be increased depending on needs.

For example, in the embodiment, the sound cabinet structure 140 further includes an extending section 148 which extends from the sound output opening 144 toward the resonance cavity 142. The hitting sound concentrates in the accommodating recess 114 via the channel 146 and is transmitted out of the sound output opening 144 via the extending section 148 after passing through the sound cabinet structure 140. Accordingly, in the above formula, the length of the sound output opening 144 (i.e. parameter L in the above formula, represented by height H4 in FIG. 4) is sum of the depth of the sound output opening 144 (i.e. thickness of the casing 110) in the casing 110 and the length of the extending section 148. In other words, the configuration of the extending section 148 helps to increase the length of the sound output opening 144, such that the tone (related to the frequency thereof) of the hitting sound generated by the magnetic element 120 and passing through the sound cabinet structure 140 can be reduced, turning the grating sound into a deep sound. However, in other embodiment that does not have the extending section 148, the length of the sound output opening 144 is the depth of the sound output opening 144 in the casing 110 (i.e. the thickness of the casing 110). The tone of the hitting sound may be changed by adjusting the cross-section area of the sound output opening 144 or the volume of the resonance cavity 142. The invention provides no limitation to whether the extending section 148 is configured or not, which may be adjusted depending on needs.

Furthermore, in the embodiment, the sound cabinet structure 140 disposed to enable the electronic device 100 to generate a specific hitting sound is disposed in the casing 110; only the sound output opening 144 is exposed by the lateral side 112 of the casing 110. Therefore, the design of the sound cabinet structure 140 does not interfere the casing 110 from being connected to the object 102 by the lateral side 112 via the connecting portion 130 being connected with the connecting portion 102a (as shown by FIG. 1) of the object 102 and via the magnetic element 120 being attached to the magnetic element 102b of the object 102; accordingly, the appearance of the electronic device 100 is not affected.

Based on the above, in the electronic device of the invention, the magnetic element is disposed in the accommodating recess of the casing, such that the casing is connected to the object by the lateral side or removed from the object via the magnetic element being moving in the accommodating recess. Moreover, the sound cabinet structure is disposed in the casing to effect the hitting sound generated by the magnetic element when moving in and contacting the accommodating recess. More specifically, the sound cabinet structure includes the resonance cavity communicated with the accommodating recess and the sound output opening communicated with the resonance cavity, such that the hitting sound generated by the magnetic element may pass through and be effected by the sound cabinet structure, for example, be transmitted out of the sound output opening from the accommodating recess through resonance cavity, and the effect may be tone changing. In addition, the frequency of the hitting sound generated by the magnetic element and passing through the sound cabinet structure is in a proportional relation to the volume of the resonance cavity, the cross-section area of the sound output opening and the length of the sound output opening. Accordingly, the electronic device of the invention may generate a specific hitting sound when being connected to another object.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic device, comprising:
    a casing, having an accommodating recess located in the casing;
    a sound cabinet structure, located in the casing and adjacent to the accommodating recess, the sound cabinet structure comprising a resonance cavity and a sound output opening, the resonance cavity communicated with the accommodating recess, the sound output opening penetrating through the casing and communicated with the resonance cavity; and
    a magnetic element, disposed in the accommodating recess and adaptable to move in the accommodating recess, such that the casing is adaptable to be connected to an object or removed from the object, and
    a hitting sound generated by the magnetic element moving in and contacting the accommodating recess passes through and is effected by the sound cabinet structure.

2. The electronic device according to claim 1, wherein the accommodating recess and the sound cabinet structure are adjacent to a lateral side of the casing, such that the casing is adaptable to be connected to the object by the lateral side.

3. The electronic device according to claim 2, further comprising:
    a magnetized element, disposed in a side of the accommodating recess away from the lateral side, wherein a height of the accommodating recess in a moving axis is greater than a width of the magnetic element in the moving axis, the magnetic element is adaptable to be attached to the magnetized element to contact the side of the accommodating recess away from the lateral side, and adaptable to move along the moving axis to contact another side of the accommodating recess adjacent to the lateral side when the casing is close to the object, such that the casing is connected to the object, and the magnetic element generates the hitting sound when contacting the accommodating recess.

4. The electronic device according to claim 3, further comprising:
    two buffering elements, disposed in two opposite sides of the magnetic element and adaptable to correspondingly contact the magnetized element or the side of the accommodating recess adjacent to the lateral side when the magnetic element moves in the accommodating recess.

5. The electronic device according to claim 1, wherein the sound cabinet structure further comprises an extending section extending from the sound output opening toward the resonance cavity.

6. The electronic device according to claim 1, wherein the sound cabinet structure further comprises a channel, the accommodating recess is communicated with the resonance cavity via the channel, wherein a cross-section area of the channel is less than a cross-section area of the resonance cavity, and the cross-section area of the channel is less than a cross-section area of the accommodating recess.

7. The electronic device according to claim 1, wherein a cross-section area of the accommodating recess is greater than a cross-section area of the resonance cavity, and the cross-section area of the resonance cavity is greater than a cross-section area of the sound output opening.

8. The electronic device according to claim 1, wherein a volume of the accommodating recess is greater than a volume of the resonance cavity, and the volume of the resonance cavity is greater than a volume of the sound output opening.

9. The electronic device according to claim 1, wherein a frequency of the hitting sound generated by the magnetic element and passing through the sound cabinet structure is in a proportional relation to a volume of the resonance cavity, a cross-section area of the sound output opening, and a length of the sound output opening.

10. The electronic device according to claim 9, wherein the frequency of the hitting sound is in a direct ratio to the cross-section of the sound output opening, and is in an inverse ratio to the volume of the resonance cavity and the length of the sound output opening.

\* \* \* \* \*